United States Patent
Kambara

[11] Patent Number: 5,757,076
[45] Date of Patent: May 26, 1998

[54] CHIP TYPE ELECTRONIC COMPONENT

[75] Inventor: Shigeru Kambara, Kyoto, Japan

[73] Assignee: Rohm Co., Ltd., Kyoto, Japan

[21] Appl. No.: 949,541

[22] Filed: Oct. 14, 1997

Related U.S. Application Data

[63] Continuation of Ser. No. 644,151, May 10, 1996, abandoned.

[30] Foreign Application Priority Data

May 11, 1995 [JP] Japan .................... 7-113305

[51] Int. Cl.$^6$ .................. H01L 23/34; H01L 23/48; H01C 1/012; H01G 4/005
[52] U.S. Cl. .................. 257/724; 257/687; 257/735; 257/773; 257/775; 257/924; 338/203; 338/272; 338/306; 338/307; 338/308; 338/309; 361/303; 361/306.1; 361/310
[58] Field of Search ............... 257/48, 687, 724, 257/725, 735, 773, 775, 904, 924; 361/303, 306.1, 310; 338/203, 271, 272, 306–309, 314

[56] References Cited

U.S. PATENT DOCUMENTS

| | | | |
|---|---|---|---|
| 4,417,298 | 11/1983 | Nakata et al. | 361/540 |
| 4,539,623 | 9/1985 | Irikura et al. | 361/540 |
| 4,899,126 | 2/1990 | Yamada | 338/309 |
| 5,065,211 | 11/1991 | Imamura | 257/538 |
| 5,311,651 | 5/1994 | Kim et al. | 29/25.42 |
| 5,345,361 | 9/1994 | Billotte et al. | 361/313 |
| 5,406,027 | 4/1995 | Matsumoto et al. | 174/52.2 |

FOREIGN PATENT DOCUMENTS

| | | |
|---|---|---|
| 60-116203 | 8/1985 | Japan . |
| 63-12366 | 3/1988 | Japan . |

*Primary Examiner*—Mahshid D. Saadat
*Assistant Examiner*—Allan R. Wilson
*Attorney, Agent, or Firm*—Merchant, Gould, Smith, Edell, Welter & Schmidt

[57] ABSTRACT

A chip type electronic component is provided which includes a chip substrate having an opposite pair of end edges and an opposite pair of side edges between the pair of end edges. An opposite pair of first electrodes is formed in a layer on the chip substrate to extend from the end edges toward each other. Each first electrode has a narrower root portion closer to a corresponding end edge of the chip substrate and a wider head portion spaced from the corresponding end edge. An electronic element is formed in another layer on the chip substrate in electrical conduction with both of the first electrodes, and an insulating protective coating is formed on the chip substrate to entirely cover the electronic element together with the entire wider head portion of each electrode.

7 Claims, 5 Drawing Sheets

CHIP TYPE ELECTRONIC COMPONENT

This is a Continuation of application Ser. No. 08/644,151, filed May 10, 1996 now abandoned.

BACKGROUND OF THE INVENTION

1. Field of the Invention

This invention relates to a chip type electronic component wherein at least one layered electronic element is formed on an insulating chip substrate.

Examples of chip type electronic component include a chip type resistor device, a chip type capacitor device or a CR (capacitor-resistor) composite device.

2. Description of the Related Art

A chip type electronic component is known which comprises a layered electronic element formed on a chip substrate. For instance, a prior art chip type resistor device comprises a rectangular insulating chip substrate, an opposite pair of top electrodes formed on the chip substrate to extend from the shorter edges toward each other, and a trimmed resistor element layer electrically connected to both of the top electrodes. Each of the first electrodes has a narrower root portion closer to a corresponding shorter edge of the chip substrate and a wider head portion spaced from the corresponding shorter edge. The resistor element together with part of the top electrodes is covered by an insulating protective coating formed on the chip substrate.

The above-described resistor device may be manufactured by using a master substrate, as shown in FIG. 8 of the accompanying drawings. Specifically, the master substrate 11 is formed with a plurality of transverse division lines 11a" and a plurality of longitudinal division lines 11b" perpendicular to the transverse division lines 11a". The master substrate 11" provides a plurality of chip substrates 1" when divided along the respective division lines 11a", 11b".

In manufacture, a plurality of top electrodes 2" are formed in a layer on the top surface of the master substrate 11" in a manner such that each top electrode 2" extends across a transverse division line 11a" between two adjacent longitudinal division lines 11b". Each of the top electrodes 2" includes a narrower root portion located at a corresponding transverse division line 11a" and a pair of wider head portions at both ends of the narrower root portion.

Then, a plurality of resistor elements 3" are formed in layers on the top surface of the master substrate 11" in a manner such that each resistor element 3" extends from one top electrode 2" to another between two adjacent longitudinal division lines 11b".

Then, a trimming groove 6" is formed by laser beam radiation in each of the resistor elements 3" for adjusting its resistance to a predetermined value.

Then, a plurality of strip-like protective coatings 4" are formed separately for the individual chip substrates 1" to cover the respective resistor element 3" together with part of the top electrodes 2".

Finally, the master substrate 11" is divided along the respective transverse and longitudinal division lines 11a", 11b" into a plurality of chip substrates 1". Normally, each shorter edge of each chip substrate 1" is formed with an end electrode (not shown) in electrical conduction with a corresponding top electrode 2" before the master substrate 11" is divided along the longitudinal division lines 11b".

The above-described method of making the prior art chip type resistor device is acceptable as long as the size of the individual chip substrates 1" is relatively large. However, if the size of the individual chip substrates 1" is reduced to 1.6×0.8 mm or 1.0×0.5 mm, the following problem may occur.

Specifically, as shown in FIG. 9, since the length of the narrower root or neck portion of each top electrode 2" is much smaller (in the direction along the longitudinal division lines 11b") than the head portion, the position of the narrower root portion of the top electrode 2" is likely to deviate from the corresponding transverse division line 11a" due to manufacturing errors if the size of each chip substrate 1" is extremely reduced. Once this occurs, the wider head portion of the top electrode 2" is formed over the corresponding transverse division line 11a", thereby making it difficult to divide the master substrate 11" along the transverse division line 11a".

SUMMARY OF THE INVENTION

It is, therefore, an object of the present invention to provide a chip type electronic component which overcomes the above-described problems of the prior art.

According to the present invention, there is provided a chip type electronic component comprising:

an insulating chip substrate having an opposite pair of end edges and an opposite pair of side edges between the pair of end edges;

an opposite pair of first electrodes formed in a layer on the chip substrate to extend from the end edges toward each other, each of the first electrodes having a narrower root portion closer to a corresponding end edge of the chip substrate and a wider head portion spaced from said corresponding end edge;

an opposite pair of second electrodes formed to cover the end edges of the chip substrate in electrical conduction with the first electrodes;

at least one electronic element electrically connected to both of the first electrodes; and an insulating protective coating formed on the chip substrate to cover the electronic element together with part of the first electrodes;

wherein the insulating protective coating entirely covers the wider head portion of said each of the first electrodes and extends onto the narrower root portion of said each of the first electrodes.

The technical advantages of such an electronic device will be specifically described hereinafter on the basis of the preferred embodiments of the present invention.

Assuming that the chip substrate has a first length, the narrower root portion of each first electrode may preferably have a second length which is 0.10–0.25 times the first length. Further, each of the second electrodes may preferably extend up to and into contact with the protective coating.

According to one embodiment of the present invention, the electronic element is a resistor element which is trimmed for resistance adjustment.

According to another embodiment of the present invention, the electronic element is a capacitor element. In this case, the capacitor element comprises a dielectric layer formed on the wider head portion of one first electrode, and the electronic component further comprises an additional electrode formed on the dielectric layer to extend onto the chip substrate as well as a resistor element formed on the chip substrate to extend from the additional electrode to the wider head portion of the other first electrode. The resistor element in this embodiment may also be trimmed for resistance adjustment.

Other objects, features and advantages of the present invention will be fully understood from the following detailed description given with reference to the accompanying drawings.

DETAILED DESCRIPTION OF THE PREFERRED EMBODIMENTS

Figure 1:
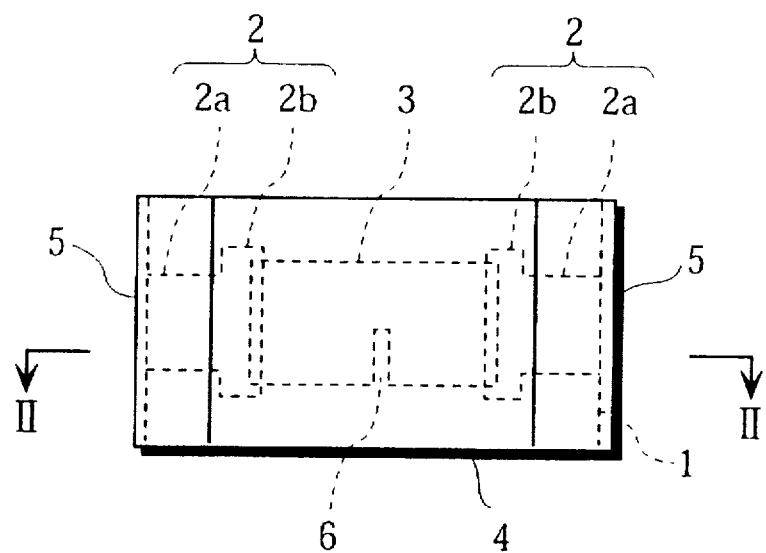
FIG. 1 is a plan view showing a chip type electronic component according to a first embodiment of the present invention.
Figure 2:
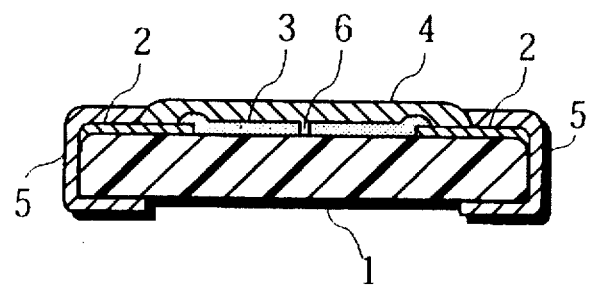
FIG. 2 is a sectional view taken on lines II—II in FIG. 2.

FIGS. 1 and 2 of the accompanying drawings illustrate a chip type resistor device according to the first embodiment of the present invention. The resistor device of this embodiment comprises a rectangular chip substrate 1 which is made of a heat-resistant insulating material such as alumina. The chip substrate 1 has a top surface layer formed with a pair of top electrodes 2 spaced from the longitudinal edges of the substrate 1 and extending toward the longitudinal center from the shorter edges.

According to the first embodiment, each of the top electrodes 2 includes a narrower root portion 2a having a relatively large longitudinal dimension, and a wider head portion 2b having a relatively small longitudinal dimension. Assuming that the length (longitudinal dimension) of the chip substrate 1 is unity, the length (longitudinal dimension) of the narrow root portion 2a may be advantageously of the order of 0.10–0.25.

The top surface of the chip substrate 1 is also formed with a resistor layer element 3 which bridges between the wider head portions 2b of the respective top electrodes 2. The resistor element 3 is centrally formed with a trimming groove 6 for resistance adjustment. Further, the resistor element 3 together with the wider head portions 2b of the respective top electrodes 2 is entirely covered by a protective coating 4 which is made of a heat-resistant insulating material such as glass.

Further, each end face of the chip substrate 1 is formed with an end electrode 5 which also extends onto the top and bottom surfaces of the substrate. In the illustrated first embodiment, the end electrode 5 extends up to and into contact with a corresponding end edge of the protective coating 4, as clearly shown in FIG. 2.

According to the arrangement described above, since the protective coating 4 entirely covers the wider head portions 2b of the respective top electrodes 2, the protective coating 4 comes into improved anchoring engagement with the wider head portions 2b, thereby preventing unexpected removal of the protective coating 4 from the top surface of the chip substrate 1. Further, since each end electrode 5 extends up to and into contact with a corresponding end edge of the protective coating 4, the continuity between the protective coating 4 and the end electrode 5 provides an improved surface flatness as required to reliably hold the chip type resistor device by a suction collet (vacuum collet) for mounting onto a circuit board while also improving the overall appearance of the resistor device.

The chip type resistor device having the above-described structure may be conveniently manufactured in the following manner.

Figure 3:
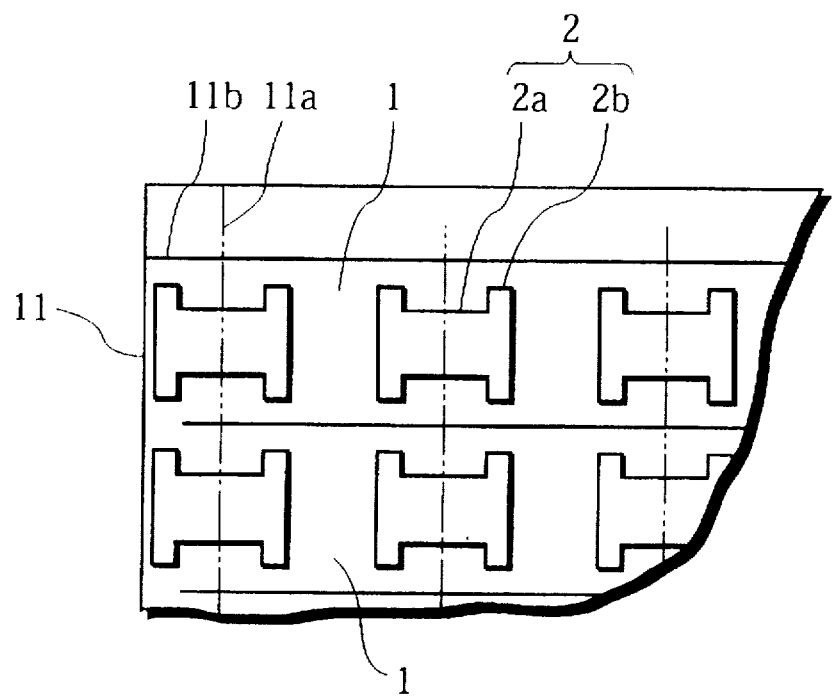
FIGS. 3 through 5 are plan views showing the successive steps of making the chip type electronic component illustrated in FIGS. 1 and 2.

First, as shown in FIG. 3, a master substrate 11 is prepared which is formed with a plurality of transverse division lines 11a and a plurality of longitudinal division lines 11b perpendicular to the transverse division lines 11a. Each of the division lines 11a, 11b may be a scribed line or a groove. The master substrate 11 provides a plurality of chip substrates 1 when divided along the respective division lines 11a, 11b.

Then, as also shown in FIG. 3, a plurality of top electrodes 2 are formed in a layer on the top surface of the master substrate 11 in a manner such that each top electrode 2 extends across a transverse division line 11a between two adjacent longitudinal division lines 11b. Each of the top electrodes 2 includes a narrower root portion 2a and a pair of wider head portions 2b at both ends of the narrower root portion 2a. The top electrodes 2 may be formed by printing an electrically conductive paste such as silver paste in a predetermined pattern and then baking the patterned conductive paste for fixation. Though not shown, a plurality of bottom electrodes may be similarly formed in a layer on the bottom surface of the master substrate 11 in the same arrangement and configuration as the top electrodes 2.

As clearly appreciated from FIG. 3, since the narrower root portions 2a of the respective top electrodes 2 are relatively long, they can be reliably made to extend across the corresponding transverse division lines 11a even if the size of each chip substrate 1 is reduced to 1.6×0.8 mm or 1.0×0.5 mm where the printing operation is likely to be performed in a positionally deviating manner. Thus, subsequent division of the master substrate 11 along the transverse division lines 11a may be always performed easily.

Figure 4:
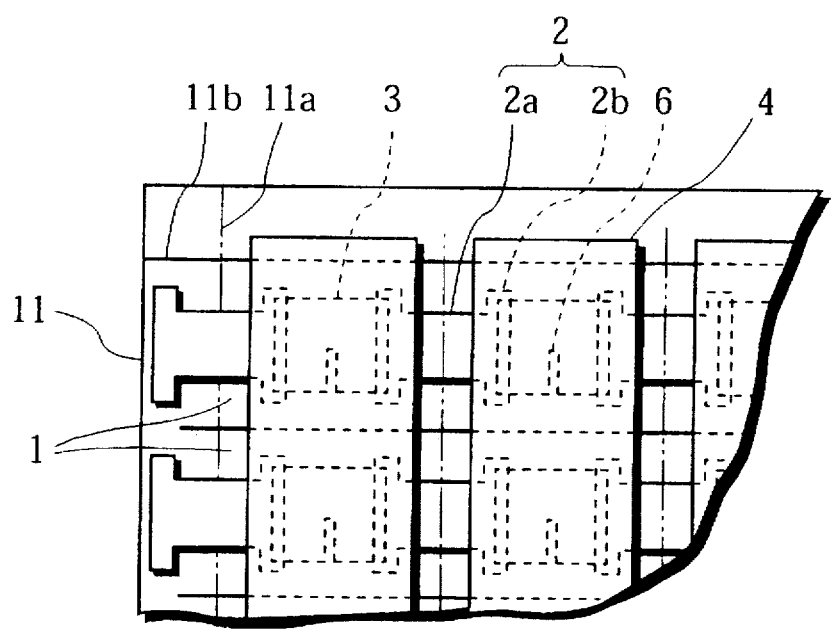

Then, as shown in FIG. 4, a plurality of resistor elements 3 are formed measured on the top surface of the master substrate 11 in a manner such that each resistor element 3 extends from one top electrode 2 to another between two adjacent longitudinal division lines 11b. The formation of the resistor elements 3 may be performed by printing a pasty resistor material in a predetermined pattern and then baking the patterned resistor material for fixation. Alternatively, the formation of the resistor elements 3 may be performed by a known thin film forming technique such as sputtering.

Then, as also shown in FIG. 4, a trimming groove 6 is formed in each of the resistor elements 3 for adjusting its resistance to a predetermined value. The formation of the trimming groove 6 may be performed by directing a laser beam toward the resistor element 3 while the resistance across the resistor element 3 is measured by a pair of probes (not shown) brought into contact with two top electrodes 2 associated with the resistor element 3. If required or preferred, the resistor element 3 may be wholly or partially covered by a provisional glass layer (not shown) while the trimming operation is performed.

Figure 8:
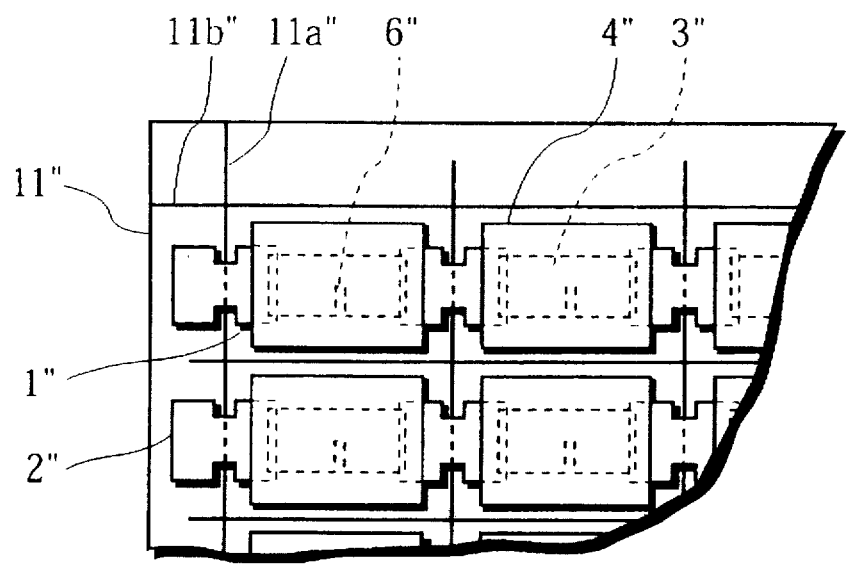
FIG. 8 is a plan view showing a method of making prior art chip type electronic components.
Figure 9:
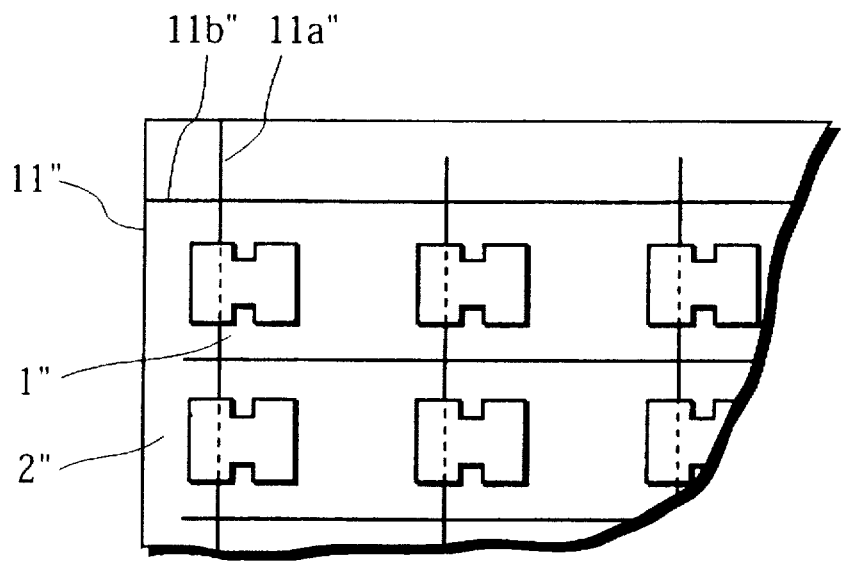
FIG. 9 is also a plan view illustrating a problem which may be encountered in making the prior art electronic components.

Then, as additionally shown in FIG. 4, a plurality of strip-like protective coatings 4 are formed in a manner such that each strip-like protective coating 4 entirely covers the wider head portions 2b of the respective top electrodes 2 between two adjacent transverse division lines 11a. The formation of the protective coatings 4 may be performed by printing a glass paste in a predetermined pattern and then baking the patterned glass paste for fixation. Alternatively, the protective coatings 4 may be formed by printing a resin paste in a predetermined pattern and then allowing the patterned resin paste to harden. While, in the illustrated example, the protective coatings 4 are each in the form of a strip extending along and between the transverse division lines 11a, such protective coatings may be formed separately for the individual chip substrates 1 (similarly to the prior art shown in FIG. 8), thereby facilitating subsequent division of the master substrate 11 along the longitudinal division lines 11a.

Figure 5:
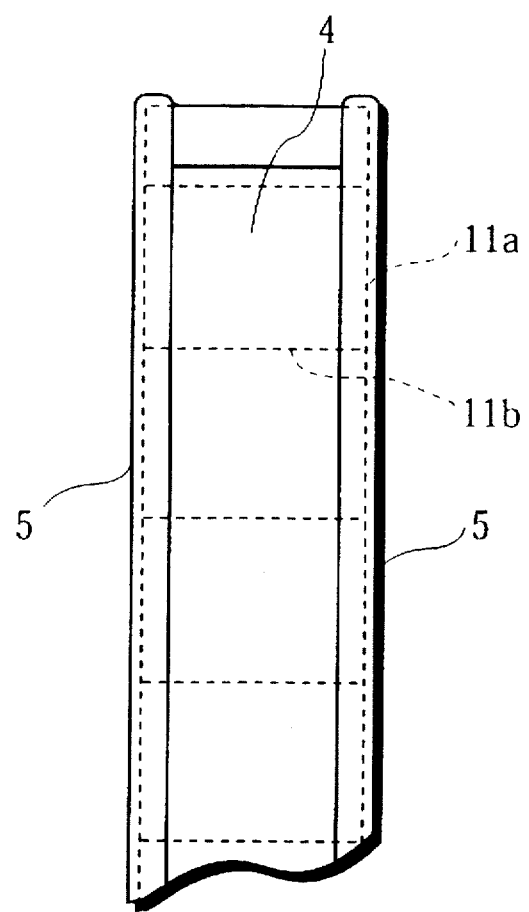

Then, as shown in FIG. 5, the master substrate 11 is divided along the respective transverse division lines 11a into a plurality of strip substrates (only one shown), and a strip-like end electrode 5 is formed along each transverse division line 11a into contact with the protective coating 4. The formation of the end electrode 5 may be performed by applying an electrically conductive paste (e.g. silver paste, silver-palladium paste, electrically conductive resin paste containing metal particles) and then baking or hardening the paste. Alternatively, the end electrode 5 may be formed by a known thin film forming technique such as sputtering wherein a metal material such as silver, nickel or solder is deposited into a thin layer.

Finally, each of the substrate strips is divided along the longitudinal division lines 11b to provide a plurality of chip type resistor devices each having the structure illustrated in FIGS. 1 and 2. If required, each of the end electrodes 5 may be additionally plated with nickel or solder for example.

Figure 6:
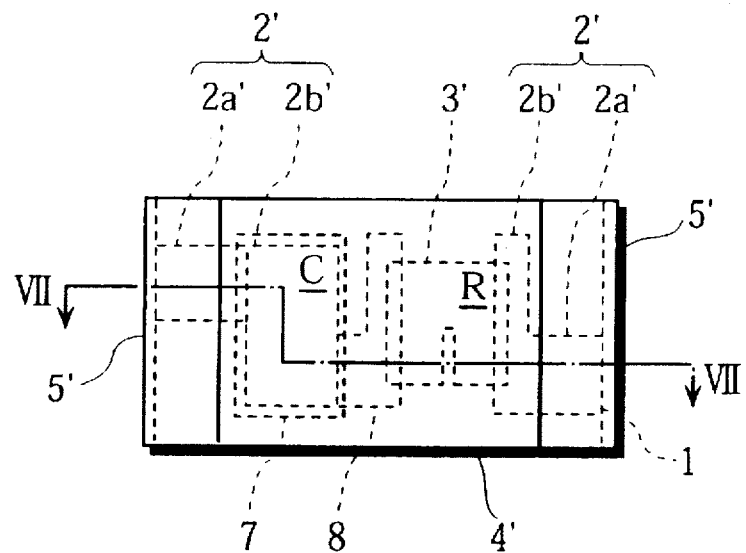
FIG. 6 is a plan view showing a chip type electronic component according to a second embodiment of the present invention.
Figure 7:
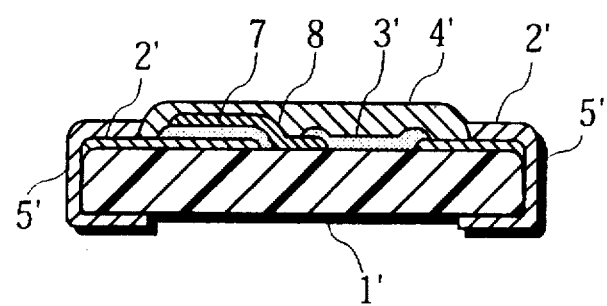
FIG. 7 is a sectional view taken along lines VII—VII in FIG. 6.

FIGS. 6 and 7 of the accompanying drawings illustrate a chip type CR (capacitor-resistor) composite device according to the second embodiment of the present invention. The composite device of this embodiment comprises a rectangular chip substrate 1' carrying a capacitor element C and a resistor element R connected in series. The chip substrate 1' may be made of a heat-resistant insulating material such as alumina.

The chip substrate 1' has a top surface formed with a pair of layer-like top electrodes 2' spaced from the longitudinal edges of the substrate 1' and extending toward the longitudinal center from the shorter edges. Like the first embodiment, each of the top electrodes 2' includes a narrower root portion 2a' having a relatively large longitudinal dimension, and a wider head portion 2b' having a relatively small longitudinal dimension. In the second embodiment, one top electrode 2' (left-hand top electrode) is a capacitor electrode, whereas the other top electrode 2' (right-hand top electrode) is a resistor electrode.

A dielectric layer 7 constituting a part of the capacitor element C is formed on the wider head portion 2b' of the capacitor top electrode 2' (left-hand top electrode), as shown in FIG. 7. Further, an additional electrode layer 8 is formed on the dielectric layer 7 to partially extend onto the top surface of the chip substrate 1'. According to the second embodiment, the additional electrode 8 works dually as a second capacitor electrode and as a second resistor electrode.

The top surface of the chip substrate 1' is also formed with a trimmed resistor layer 3' which extends from the additional electrode layer 8 to the resistor top electrode of electrodes 2'. Obviously, the resistor layer 3' constitutes the resistor element R. The resistor layer 3', the dielectric layer 7 and the additional electrode layer 8 together with the wider head portions 2b' of the respective top electrodes 2' are entirely covered by a protective coating 4' which is made of a heat-resistant insulating material such as glass.

Further, each end face of the chip substrate 1' is formed with an end electrode 5' which also extends onto the top and bottom surfaces of the substrate. As in the first embodiment, the end electrode 5' extends up to and into contact with a corresponding end edge of the protective coating 4', as clearly shown in FIG. 7. The end electrode 5' may be plated with a metal such as nickel or solder.

The CR composite device of the second embodiment may be manufactured substantially in the same manner as the resistor device of the first embodiment (see FIGS. 3–5) except for the need for additional steps of forming the dielectric layer 7 and the additional electrode layer 8. The formation of the dielectric layer 7 and the additional electrode layer 8 may be performed in a known manner by using well known materials.

The preferred embodiments of the present invention being thus described, it is obvious that the same may be varied in many ways. For instance, each end electrode 5 or 5' may be formed to extend slightly short of the protective coating 4 or 4'. Further, the narrower portion 2a or 2a' may be made to have two or more different width sections, or it may be tapered toward the longitudinal center of the chip substrate 1 or 1'. Such variations are not to be regarded as a departure from the spirit and scope of the present invention, and all such modifications as would be obvious to those skilled in the art are intended to be included within the scope of the following claims.

I claim:

1. A chip type electronic component comprising:

an insulating chip substrate having a continuously flat support surface, an opposite pair of end edges, and an opposite pair of side edges between the pair of end edges;

an opposite pair of first electrodes formed in a layer on the support surface of the chip substrate to extend from the end edges toward each other, each of the first electrodes having a narrower root portion—closer to a corresponding end edge of the chip substrate and a wider head portion spaced from said corresponding end edge;

an opposite pair of second electrodes formed in a layer to cover the end edges of the chip substrate in electrical conduction with the first electrodes;

at least one electronic element electrically connected to both of the first electrodes; and an insulating protective coating on the support surface of the chip substrate to cover the electronic element together with part of the first electrodes;

wherein the insulating protective coating entirely covers the wider head portion of said each of the first electrodes and extends onto the narrower root portion of said each of the first electrodes; and each of the second electrodes extends from a respective end edge up to the protective coating to make nonoverlapping contact therewith.

2. The electronic component according to claim 1, wherein the chip substrate has a first length, the narrower root portion of each first electrode having a second length which is 0.10–0.25 times the first length.

3. The electronic component according to claim 1, wherein the protective coating is shorter than the chip substrate and spaced from the end edges of the chip substrate.

4. The electronic component according to claim 1, wherein the electronic element is a resistor element which is trimmed for resistance adjustment.

5. The electronic component according to claim 1, wherein the electronic element is a capacitor element.

6. The electronic component according to claim 5, wherein the capacitor element comprises a dielectric layer formed on the wider head portion of one first electrode, the electronic component further comprising an additional layer-like electrode formed on the dielectric layer to extend onto the chip substrate as well as a resistor element formed on the chip substrate to extend from the additional electrode to the wider head portion of the other first electrode.

7. The electronic component according to claim 6, wherein the resistor element is trimmed for resistance adjustment.

* * * * *